(12) United States Patent
Zhu et al.

(10) Patent No.: US 9,365,437 B2
(45) Date of Patent: Jun. 14, 2016

(54) METHOD AND APPARATUS FOR MONITORING AND CONTROLLING OZONATION AND AERATED FILTRATION USING UV AND VISIBLE SPECTRAL MEASUREMENT AND OXIDATION REDUCTION POTENTIAL

(71) Applicant: Xylem Water Solutions Zelienople LLC, Zelienople, PA (US)

(72) Inventors: Ivan X. Zhu, Cranberry Township, PA (US); Brian J. Bates, Bridgenorth (CA)

(73) Assignee: Xylem Water Solutions Zelienople LLC, Zelienople, PA (US)

( * ) Notice: Subject to any disclaimer, the term of this patent is extended or adjusted under 35 U.S.C. 154(b) by 0 days.

(21) Appl. No.: 14/420,599

(22) PCT Filed: Jul. 3, 2013

(86) PCT No.: PCT/US2013/049187
§ 371 (c)(1),
(2) Date: Feb. 9, 2015

(87) PCT Pub. No.: WO2014/025478
PCT Pub. Date: Feb. 13, 2014

(65) Prior Publication Data
US 2015/0218011 A1   Aug. 6, 2015

Related U.S. Application Data

(60) Provisional application No. 61/681,991, filed on Aug. 10, 2012.

(51) Int. Cl.
*C02F 1/72* (2006.01)
*C02F 1/74* (2006.01)
(Continued)

(52) U.S. Cl.
CPC . *C02F 1/008* (2013.01); *C02F 1/74* (2013.01); *C02F 1/78* (2013.01); *C02F 3/006* (2013.01);
(Continued)

(58) Field of Classification Search
CPC ........ C02F 1/78; C02F 2209/006; C02F 3/06; C02F 1/74; C02F 2209/003; C02F 2209/005; C02F 3/02; C02F 3/005; C02F 3/006; C02F 2209/04; C02F 2209/08; C02F 2209/10; C02F 2209/20; Y02W 10/15
See application file for complete search history.

(56) References Cited

U.S. PATENT DOCUMENTS

| 4,280,910 A | 7/1981 | Baumann |
| 4,525,278 A | 6/1985 | Frost, III |

(Continued)

FOREIGN PATENT DOCUMENTS

KR   20010078879   *   8/2001   ................ C02F 3/02

OTHER PUBLICATIONS

KR 1020010078879 A.pdf—machine translation of KR 2001-0078879—Aug. 22, 2001.*

*Primary Examiner* — Krishnan S Menon
*Assistant Examiner* — Bradley R Spies
(74) *Attorney, Agent, or Firm* — The Webb Law Firm

(57) ABSTRACT

The present invention relates to a method and system for monitoring and controlling the process train of ozonation and biologically aerated filtration used in water and wastewater treatment. The process monitoring and control can be achieved by online measurement of UV/Vis absorption at one or multiple wavelengths and oxidation/reduction potential values which are compared to predetermined UV absorption and oxidation/reduction values. The air and ozone dosage of the effluent are then adjusted based on the measured values of UV/Vis absorption and oxidation/reduction potential of the effluent.

13 Claims, 2 Drawing Sheets

(51) Int. Cl.
*C02F 1/78* (2006.01)
*C02F 1/00* (2006.01)
C02F 3/02 (2006.01)
C02F 3/06 (2006.01)
C02F 3/00 (2006.01)

(52) U.S. Cl.
CPC ............ *C02F 3/06* (2013.01); *C02F 2209/003* (2013.01); *C02F 2209/006* (2013.01); *C02F 2209/04* (2013.01); *C02F 2209/08* (2013.01); *C02F 2209/10* (2013.01); *C02F 2209/11* (2013.01); *C02F 2209/15* (2013.01); *C02F 2209/20* (2013.01); *C02F 2209/38* (2013.01); *Y02W 10/15* (2015.05)

(56) References Cited

U.S. PATENT DOCUMENTS

| | | | |
|---|---|---|---|
| 4,816,145 A | 3/1989 | Goudy, Jr. | |
| 5,017,284 A | 5/1991 | Miler et al. | |
| 5,053,140 A * | 10/1991 | Hurst | 210/704 |
| 5,506,096 A | 4/1996 | Helmo | |
| 5,711,887 A | 1/1998 | Gastman et al. | |
| 5,800,709 A | 9/1998 | Smith | |
| 6,126,842 A * | 10/2000 | Decker | 210/760 |
| 6,153,151 A | 11/2000 | Moxley et al. | |
| 6,365,048 B1 | 4/2002 | Masten et al. | |
| 6,423,216 B1 | 7/2002 | Yum et al. | |
| 6,464,877 B1 * | 10/2002 | Mori et al. | 210/639 |
| 6,616,843 B1 * | 9/2003 | Behmann et al. | 210/605 |
| 6,733,662 B2 | 5/2004 | Pollock | |
| 6,824,695 B2 * | 11/2004 | Tempest, Jr. | 210/760 |
| 7,001,571 B2 | 2/2006 | Forney et al. | |
| 7,002,161 B2 | 2/2006 | Greene | |
| 7,108,782 B1 | 9/2006 | Higgins et al. | |
| 7,371,323 B1 | 5/2008 | Spielman et al. | |
| 7,481,937 B2 | 1/2009 | Rice et al. | |
| 7,497,957 B2 | 3/2009 | Frank | |
| 7,520,978 B2 | 4/2009 | Harbers | |
| 7,531,095 B2 | 5/2009 | Williamson et al. | |
| 7,531,096 B2 | 5/2009 | Yarbrough et al. | |
| 7,670,494 B2 | 3/2010 | Frank | |
| 7,767,093 B2 | 8/2010 | Frank | |
| 7,820,059 B2 | 10/2010 | Frank | |
| 7,931,808 B2 | 4/2011 | Elefritz, Jr. et al. | |
| 8,083,934 B2 | 12/2011 | Staschik | |
| 8,366,938 B2 * | 2/2013 | Capeau et al. | 210/703 |
| 2002/0195397 A1 * | 12/2002 | Teran et al. | 210/703 |
| 2003/0205535 A1 | 11/2003 | Roth | |
| 2005/0218074 A1 | 10/2005 | Pollock | |
| 2008/0093277 A1 | 4/2008 | Armour | |
| 2009/0081340 A1 | 3/2009 | Forney | |
| 2009/0230059 A1 | 9/2009 | McGuire et al. | |
| 2009/0255874 A1 | 10/2009 | Tenne | |
| 2010/0206787 A1 | 8/2010 | Rozenberg et al. | |
| 2010/0237009 A1 | 9/2010 | Horst | |
| 2010/0292844 A1 * | 11/2010 | Wolf | 700/271 |
| 2011/0024361 A1 | 2/2011 | Schwartzel et al. | |
| 2011/0029410 A1 | 2/2011 | Frank | |
| 2011/0168611 A1 | 7/2011 | Early et al. | |
| 2011/0259821 A1 | 10/2011 | Liu et al. | |
| 2011/0259832 A1 * | 10/2011 | Castillo Rivera et al. | 210/745 |
| 2012/0018374 A1 | 1/2012 | Sun et al. | |

* cited by examiner

METHOD AND APPARATUS FOR MONITORING AND CONTROLLING OZONATION AND AERATED FILTRATION USING UV AND VISIBLE SPECTRAL MEASUREMENT AND OXIDATION REDUCTION POTENTIAL

CROSS REFERENCE TO RELATED APPLICATIONS

This application claims priority to U.S. Patent Application No. 61/681,991, filed Aug. 10, 2012, which is hereby incorporated by reference in its entirety.

BACKGROUND OF THE INVENTION

1. Field of the Invention

The present invention relates to a method and apparatus for monitoring and controlling the process train of ozonation and biologically aerated filtration used in water and wastewater treatment.

2. Description of Related Art

The process of ozonation is widely used in water and wastewater treatment aiming to increase the biodegradability of organic constituents, and kill or inactivate bacterial or pathogenic species for disinfection. Biologically aerated filters (BAF) are a fixed bed fixed biofilm process for the simultaneous removal of biochemical oxygen demand (BOD), ammonia, and total suspended solids (TSS). Filter media can be sand, expanded clay, pumice, plastic beads, or other proprietary media. In BAF, process air is introduced in the system from the bottom to supply oxygen for BOD removal and nitrification. When headloss is built up due to the interception of TSS and biological growth, a cleaning routine is initiated by including air scouring, concurrent air and water washing, and water only washing. Usually, air for scouring is supplied with a separate delivery system. If excessive process air is delivered into the system, the effluent dissolved oxygen will be elevated. Under this situation, oxygen will not be a limiting factor for biological reaction, and the excessive air delivered will simply go back to the atmosphere with extra energy consumption. Similarly, if process air is not delivered sufficiently, dissolved oxygen in the effluent will drop and process becomes oxygen limiting. In this process combination, the use of ozone is intended for increasing biodegradability of the influent water (expressed as the ratio of BOD/COD) so that BOD can be utilized by the microbes attached on the filter media. Ozone underfeeding may not generate enough of an amount of BOD and compromise the performance; overfeeding, on the other hand, may not be necessary.

In the past, the processes of ozonation and biologically aerated filtration were controlled separately with little consideration of utilizing a unified parameter or indicator for process control and automation, where ozone dosage was usually predetermined and modified on site according to other process information such as influent BOD, TSS, and color, etc., without referencing a unified process indicator. Meanwhile, the aeration rate was generally pre-set with little variation during the operation of BAF.

SUMMARY OF THE INVENTION

In the present invention, Ultra Violet and Visible (UV/Vis) Spectral Measurement is used as a unified indicator for process monitoring and control with the assistance of online Oxidation/Reduction Potential (ORP). The combined process train of ozonation and BAF usually includes multiple online sensors for process monitoring (and control) of turbidity, total organic carbon (TOC), ammonia, and dissolved oxygen, etc. The present invention includes process control implemented through a single instrument for online monitoring effluent UV/Vis Spectrum and other information directly derived from it, with the assistance of a micro-processor, to achieve desired effluent quality as expressed by UV absorption in lieu of total organic carbon (TOC) and chemical oxygen demand (COD).

The present invention relates to a method and a system for monitoring and controlling the process train of air and ozone dosage used in water and wastewater treatment. The method of the present invention comprises obtaining an online measurement of the UV absorption at one or multiple wavelengths and of the oxidation/reduction potential of an effluent, comparing the UV absorption and oxidation/reduction potential measured for the effluent with predetermined UV absorption and oxidation/reduction potential values stored in a microprocessor, and adjusting the air and ozone dosage to the system based on the measured values of UV absorption and oxidation/reduction potential of the effluent as follows:

i. reduce the air flow rate when the measurement of the UV absorption is lower than the predetermined UV absorption value and the measurement of the oxidation/reduction potential is higher than the predetermined oxidation/reduction potential;

ii. reduce the ozone dosage when the measurement of the UV absorption is lower than the predetermined UV absorption value and the measurement of the oxidation/reduction potential is lower than or equal to the predetermined oxidation/reduction potential;

iii. increase the ozone dosage when the measurement of the UV absorption is higher than the predetermined UV absorption value and the measurement of the oxidation/reduction potential is higher than or equal to the predetermined oxidation/reduction potential; and iv. increase the air flow rate when the measurement of the UV absorption is higher than the predetermined UV absorption value and the measurement of the oxidation/reduction potential is lower than the predetermined oxidation/reduction potential.

The system of the present invention comprises sensors for measuring the UV absorption at one or multiple wavelengths and the oxidation/reduction potential of an effluent, a microprocessor for comparing the measured UV absorption and oxidation/reduction potential of the effluent with predetermined UV absorption and oxidation/reduction potential stored in the microprocessor, and a proportional, integral, and derivative control loop for adjusting the air and ozone dosage of the effluent based on the measured values of UV absorption and oxidation/reduction potential of the effluent as described above. An optional UV/Vis sensor can also be placed in front of the treatment train so that influent water qualities can be monitored in real time and control band (upper dosage limit and lower dosage limit) of ozone variation can be varied according to the actual water qualities.

DETAILED DESCRIPTION OF THE INVENTION

Figure 1:
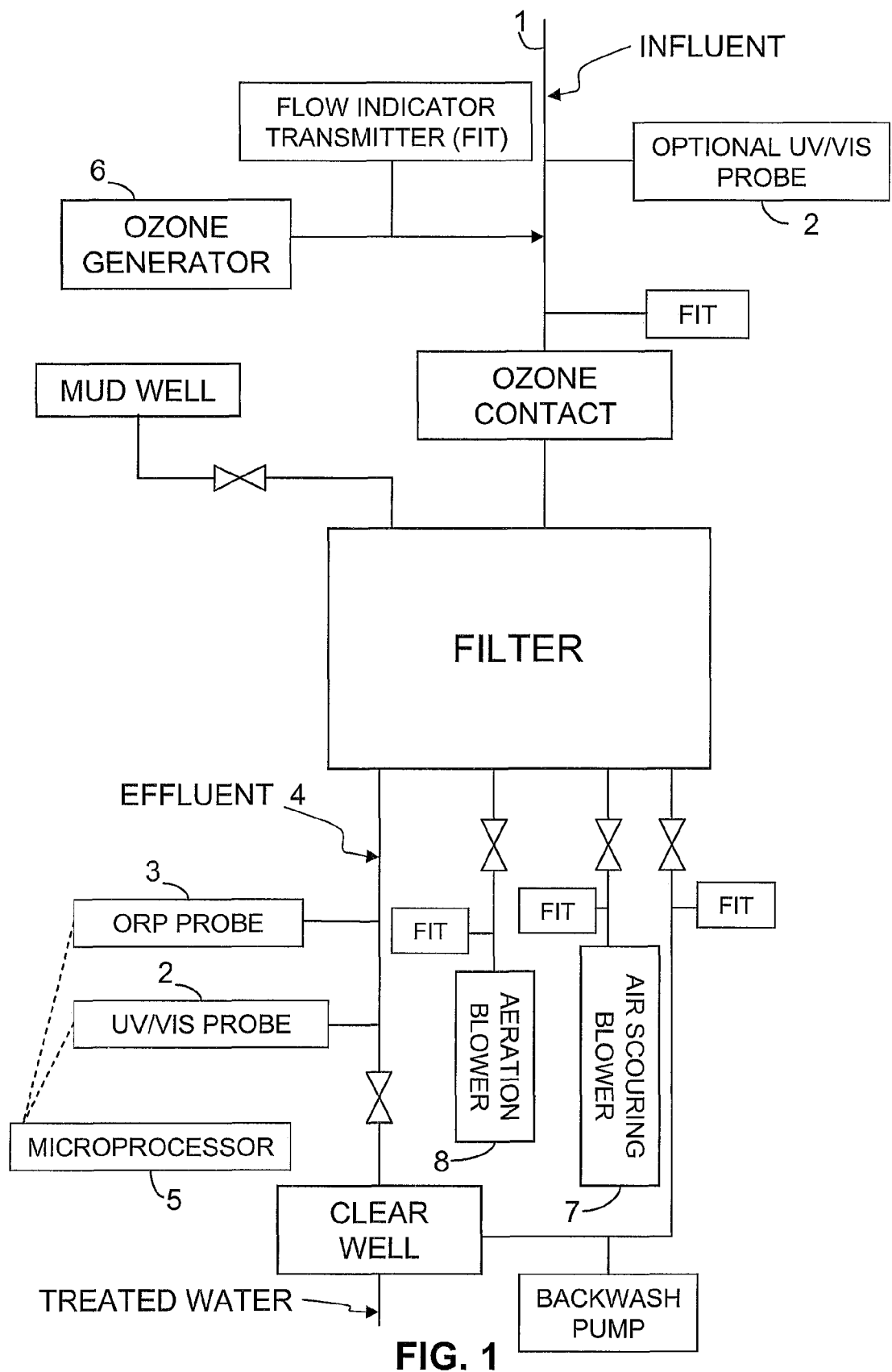
FIG. 1 is a schematic view of the system of the present invention within an ozonation and biologically aerated filtration system.

FIG. 1 shows an ozonation and biologically aerated filtration system 1 including a UV/Vis 2 and an ORP probe 3 which collect information on the water quality of the effluent 4.

A scan of UV/Vis irradiation will generate a spectrum covering 190-600 nm range. The spectrum serves as a fingerprint for nitrate and nitrite at 200-250 nm, 190-380 nm for organic constituents, and 380-600 nm for turbidity and suspended solids. UV absorption or reflectance is related to the quantity of organics, colloidal solids and other material in the water which absorb and scatter the UV light as it passes through the water, and it is well known that UV absorption is a surrogate for the measurement of organic constituents in influent and effluent streams. However, a single wavelength measurement may not be able to capture a wide range of organic substances with different functional groups and quite often generates biased results when organic constituents vary with time. A spectral scan from 190 to 380 nm will allow the system to cover a wide range of organic constituents and provide reliable information. A pre-determined correlation between organic constituents (expressed as total organic carbon or chemical oxygen demand) and UV absorption will be stored in the micro-processor 5. Online UV/Vis Spectral measurement has been proven to be a tool that allows the collection of specific information on the removal efficiency for and subsequent concentrations of (organic) substances in water. The parameters including total suspended solids (TSS), turbidity, total organic carbon, chemical oxygen demand, and nitrate/nitrite can be readily monitored with UV/Vis spectral measurements. A pre-determined target UV absorption (expressed as single wavelength absorption or scanning spectral area) in the effluent is also stored in the processor. According to the value of UV absorption, adjustment will be made to ozone dosage as well as aeration rate.

Dissolved oxygen levels in the system are strongly correlated with ORP. ORP (oxidation/reduction potential) is a measurement of the ability of the system (in millivolts) being observed to either accept electrons (reduce) or donate electrons (oxidize). When positive, the measurement indicates the degree to which the system is oxidative, and when negative, indicates the degree to which it is reductive. A desired ORP value can be user defined and stored in the processor so that enough air is provided for the process of either COD removal or nitrification, or both. The idea is to minimize the energy consumption and still meet the effluent treatment requirement. According to the measured ORP value, adjustment will be made to ozone dosage as well as aeration rate.

Adjustments to ozone dosage and aeration rate are made via the ozone generator 6 and aeration blower 8 shown in FIG. 1.

Figure 2:
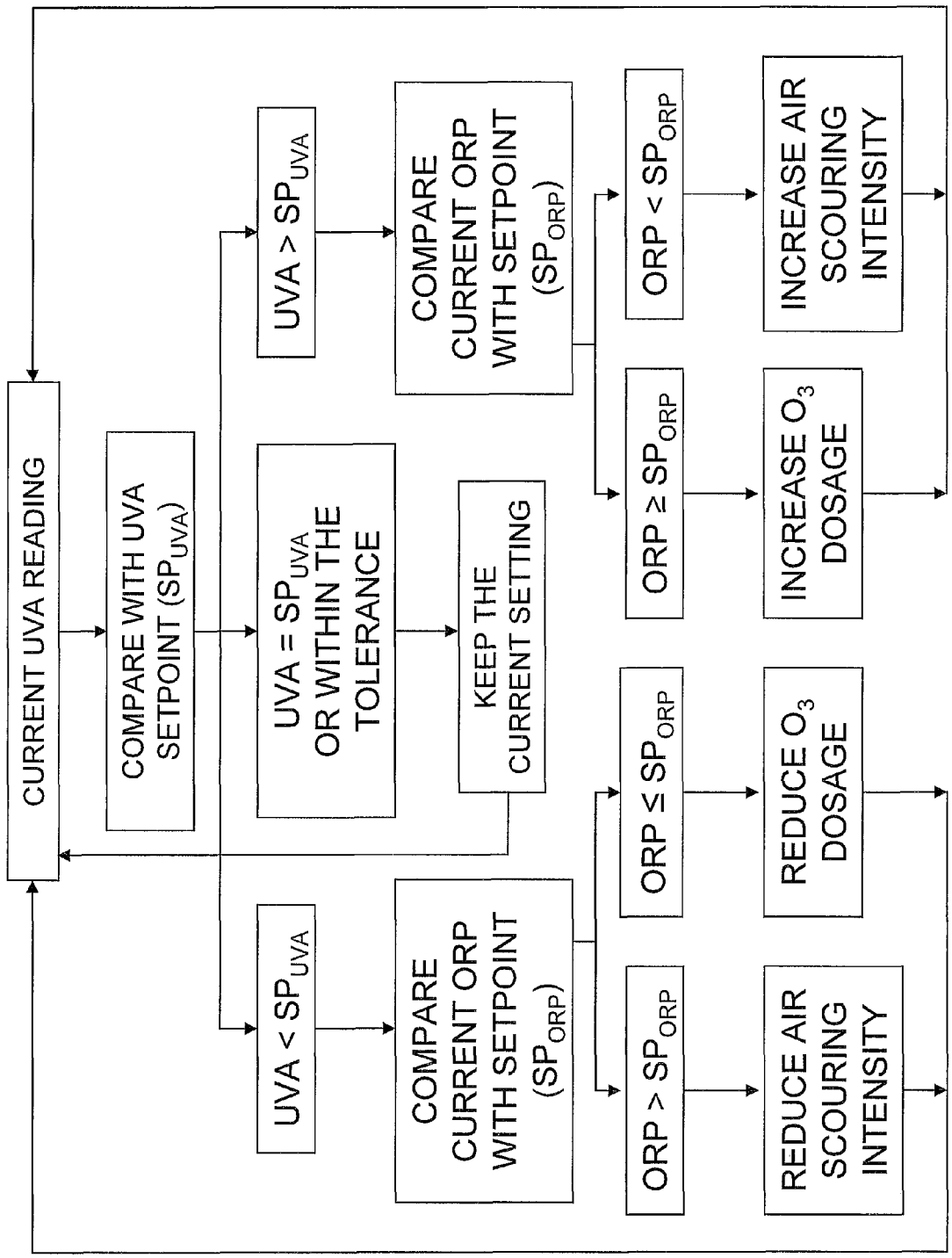
FIG. 2 is a schematic diagram showing the process control logic of the combined air and ozonation adjustments of the present method.

FIG. 2 shows the four scenarios for process adjustment based on the current UV absorption and ORP values when compared with their set points. The process adjustment of air and ozone dosage will be achieved with proportional, integral, and derivative (PID) control loop. In the control loop, a delay function will be introduced to accommodate the hydraulic retention times of the filtration system and the whole treatment system pipes, channels, and sampling systems. The four scenarios for process adjustment based on the current UV absorption and ORP values when compared with their set points are as follows:

Low UVA/High ORP=>reduce air;
Low UVA/Low ORP=>reduce $O_3$;
High UVA/High ORP=>increase $O_3$; and
High UVA/Low ORP=>increase air.

To prevent process runaway events during process adjustment, an upper limit and a lower limit for the ozone dosage will be stored in the processor; same for the air scouring rate. The upper dosage limit and lower dosage limit for ozonation can also be determined and adjusted from time to time through real-time monitoring of UV absorption of the influent of the treatment train where a UV measurement sensor is placed in front of the train. By monitoring water qualities in real time, the control band (upper dosage limit and lower dosage limit) of ozone variation can be changed according to the actual water qualities. This approach for process air adjustment is able to deal with the situation that the concentration of incoming organic constituents is relatively low and aeration is not needed. As a result of process air adjustment, the aeration blower will be turned off accordingly, and the oxidation of incoming organic constituents will only occur with consumption of the intrinsic dissolved oxygen.

Although the results for turbidity, TSS, nitrate, and nitrite may not be used for process control, they provide valuable information on the current process status and performance, especially when nitrification is required in addition to biochemical conversion.

In the present invention, process monitoring and control can be achieved by online measurement of UV absorption and ORP. UV absorption and UV transmittance is convertible through the equation, absorption=$-\log$ (transmittance). The UV transmittance reading will be used for UV lamp intensity and UV dose control of downstream UV disinfection system, if available. The advantages of this method are energy savings while maintaining the desired effluent qualities, and being simple and inexpensive.

The invention has been described with reference to the desirable embodiments. Obvious modifications and alterations will occur to others upon reading and understanding the preceding detailed description. It is intended that the invention be construed as including all such modifications and alterations.

The invention claimed is:

1. A method for monitoring and controlling a process train of air and ozone dosage used in water and wastewater treatment comprising the following steps:
   (a) obtaining an online measurement of the UV/Vis absorption of an effluent;
   (b) comparing the online measurement of the UV/Vis absorption measured for the effluent with a predetermined UV/Vis absorption value stored in a microprocessor;
   (c) obtaining an online measurement of the oxidation/reduction potential of the effluent;
   (d) comparing the online measurement of the oxidation/reduction potential measured for the effluent with a predetermined oxidation/reduction potential value stored in the microprocessor; and
   (e) adjusting the air and ozone dosage of the effluent based on the online measurements of the UV/Vis absorption and oxidation/reduction potential of the effluent as follows:
      i. reduce the air flow rate when the online measurement of the UV/Vis absorption is lower than the predetermined UV/Vis absorption and the online measurement of the oxidation/reduction potential is higher than the predetermined oxidation/reduction potential;
      ii. reduce the ozone dosage when the online measurement of the UV/Vis absorption is lower than the predetermined UV/Vis value and the online measurement of the oxidation/reduction potential is lower than or equal to the predetermined oxidation/reduction potential;
    iii. increase the ozone dosage when the online measurement of the UV/Vis absorption is higher than the predetermined UV/Vis value and the online measurement of the oxidation/reduction potential is higher than or equal to the predetermined oxidation/reduction potential;
    iv. increase the air flow rate when the online measurement of the UV absorption is higher than the predetermined UV/Vis value and the online measurement of the oxidation/reduction potential is lower than the predetermined oxidation/reduction potential; or
    v. keep the air flow rate and ozone dosage unchanged when the online measurement of the UV absorption is equal to the predetermined UV/Vis value.

2. The method for monitoring and controlling the process train of air and ozone dosage of claim 1 wherein the online measurement of the UV/Vis absorption of the effluent is obtained from a scan of UV/Vis irradiation generating a spectrum in a range from 190 nm to 600 nm.

3. The method for monitoring and controlling the process train of air and ozone dosage of claim 1 wherein the online measurement of the UV/Vis absorption of the effluent is further used for determining UV/Vis lamp intensity and UV/Vis dose control of a downstream UV disinfection system.

4. The method for monitoring and controlling the process train of air and ozone dosage of claim 1 wherein an UV/Vis sensor is placed upstream of the process train.

5. The method for monitoring and controlling the process train of air and ozone dosage of claim 4 wherein the UV/Vis sensor monitors influent water qualities in real time and an upper dosage limit and a lower dosage limit of ozone are varied according to the water qualities.

6. The method for monitoring and controlling the process train of air and ozone dosage of claim 1 wherein the predetermined oxidation/reduction potential value stored in the microprocessor is defined in relation with an amount of air necessary for a process of either chemical oxygen demand removal or nitrification or both.

7. The method for monitoring and controlling the process train of air and ozone dosage of claim 1 wherein the step of adjusting the air and ozone dosage of the effluent is achieved with proportional, integral, and derivative control loop.

8. A system for monitoring and controlling a process train of air and ozone dosage used in water and wastewater treatment comprising:
    (a) a sensor for measuring the UV/Vis absorption of an effluent providing an online measurement of the UV/Vis absorption;
    (b) a sensor for measuring the oxidation/reduction potential of the effluent providing an online measurement of the oxidation/reduction potential;
    (c) a microprocessor programmed to compare the online measurement of the UV/Vis absorption with a predetermined UV absorption value stored in the microprocessor and the online measurement of the oxidation/reduction potential of the effluent with a predetermined oxidation/reduction potential stored in the microprocessor; and
    (d) a proportional, integral, and derivative control loop programmed to adjust an air flow rate and an ozone dosage of the effluent based on the UV/Vis absorption and oxidation/reduction potential of the effluent, wherein the air flow rate and ozone dosage of the effluent are adjusted to:
        i. reduce the air flow rate when the online measurement of the UV/Vis absorption is lower than the predetermined UV/Vis absorption and the online measurement of the oxidation/reduction potential is higher than the predetermined oxidation/reduction potential;
        ii. reduce the ozone dosage when the online measurement of the UV/Vis absorption is lower than the predetermined UV/Vis value and the online measurement of the oxidation/reduction potential is lower than or equal to the predetermined oxidation/reduction potential;
        iii. increase the ozone dosage when the online measurement of the UV/Vis absorption is higher than the predetermined UV/Vis value and the online measurement of the oxidation/reduction potential is higher than or equal to the predetermined oxidation/reduction potential; or
        iv. increase the air dosage when the online measurement of the UV/Vis absorption is higher than the predetermined UV/Vis value and the online measurement of the oxidation/reduction potential is lower than the predetermined oxidation/reduction potential; or
        v. keep the air flow rate and ozone dosage unchanged when the online measurement of the UV absorption is equal to the predetermined UV/Vis value.

9. The system for monitoring and controlling the process train of air and ozone dosage of claim 8 wherein the online measurement of the UV/Vis absorption of the effluent is obtained from a scan of UV/Vis irradiation generating a spectrum in a range from 190 nm to 600 nm.

10. The system for monitoring and controlling the process train of air and ozone dosage of claim 8 wherein the online measurement of the UV/Vis absorption of the effluent is further used for determining UV/Vis lamp intensity and UV/Vis dose control of a downstream UV disinfection system.

11. The system for monitoring and controlling the process train of air and ozone dosage of claim 8 wherein an UV/Vis sensor is placed, upstream of the process train.

12. The system for monitoring and controlling the process train of air and ozone dosage of claim 11 wherein the UV/Vis sensor monitors influent water qualities in real time and an upper dosage limit and a lower dosage limit of ozone are varied according to the water qualities.

13. The system for monitoring and controlling the process train of air and ozone dosage of claim 8 wherein the predetermined oxidation/reduction potential value stored in the microprocessor is defined in relation with an amount of air necessary for a process of either chemical oxygen demand removal or nitrification or both.

* * * * *